United States Patent
Okamoto

(10) Patent No.: US 7,979,622 B2
(45) Date of Patent: Jul. 12, 2011

(54) MEMORY ACCESS METHOD

(75) Inventor: Akira Okamoto, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 602 days.

(21) Appl. No.: 11/916,127

(22) PCT Filed: May 23, 2006

(86) PCT No.: PCT/JP2006/310196
§ 371 (c)(1),
(2), (4) Date: Nov. 30, 2007

(87) PCT Pub. No.: WO2006/129518
PCT Pub. Date: Dec. 7, 2006

(65) Prior Publication Data
US 2010/0037013 A1 Feb. 11, 2010

(30) Foreign Application Priority Data
May 30, 2005 (JP) ................................. 2005-157009

(51) Int. Cl.
*G06F 12/06* (2006.01)

(52) U.S. Cl. .............................. 711/5; 345/547; 711/157

(58) Field of Classification Search ........................ None
See application file for complete search history.

(56) References Cited

U.S. PATENT DOCUMENTS

| 6,297,857 | B1 * | 10/2001 | Jones et al. | 348/714 |
| 6,912,616 | B2 * | 6/2005 | Heap | 711/5 |
| 6,927,776 | B2 * | 8/2005 | Mino et al. | 345/538 |
| 7,386,651 | B2 * | 6/2008 | Valmiki et al. | 711/5 |

FOREIGN PATENT DOCUMENTS

| JP | 6-189292 | 7/1994 |
| JP | 8-307875 | 11/1996 |
| JP | 2000-172556 | 6/2000 |
| JP | 2002-300597 | 10/2002 |
| JP | 2002-344971 | 11/2002 |
| JP | 2002-354400 | 12/2002 |

* cited by examiner

*Primary Examiner* — Gary J Portka
(74) *Attorney, Agent, or Firm* — Oblon, Spivak, McClelland, Maier & Neustadt, L.L.P.

(57) ABSTRACT

A memory access method intended for a memory required to provide an interval of a predetermined number of clock cycles or longer between successive occurrences of access when the same bank is successively accessed, and that eliminates an idle time between successive occurrences of access to allow for improved performance. Pieces of data are written into 0th, the first, the second, and the third banks, respectively. No idle time is caused between successive occurrences of access because different banks are successively accessed. Since a burst length of each of the pieces of data is eight, an interval of 16 cycles which is longer than 15 cycles is provided between a start of writing of first data and a start of second writing of data. Accordingly, no idle time is caused also between completion of writing of the first data and start of writing of the second data.

14 Claims, 18 Drawing Sheets

F I G. 3
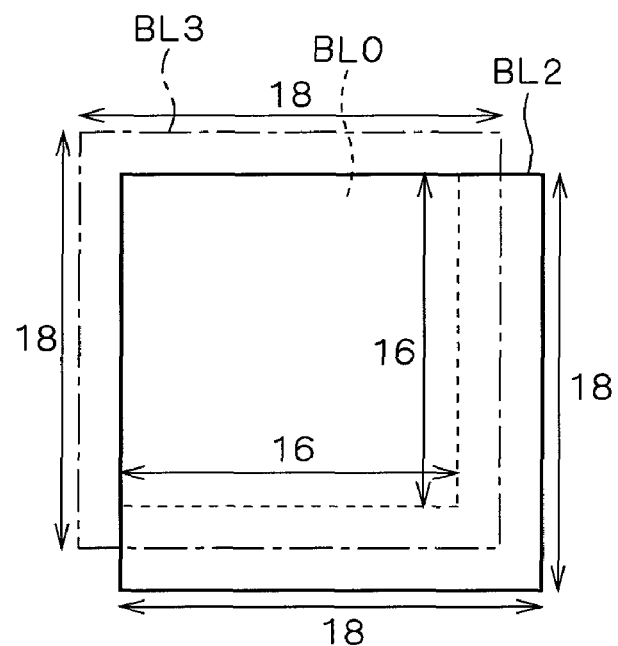
F I G. 4
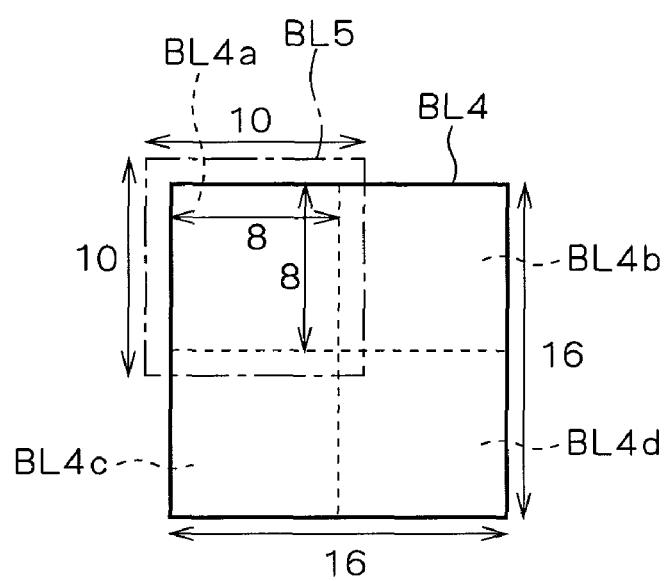

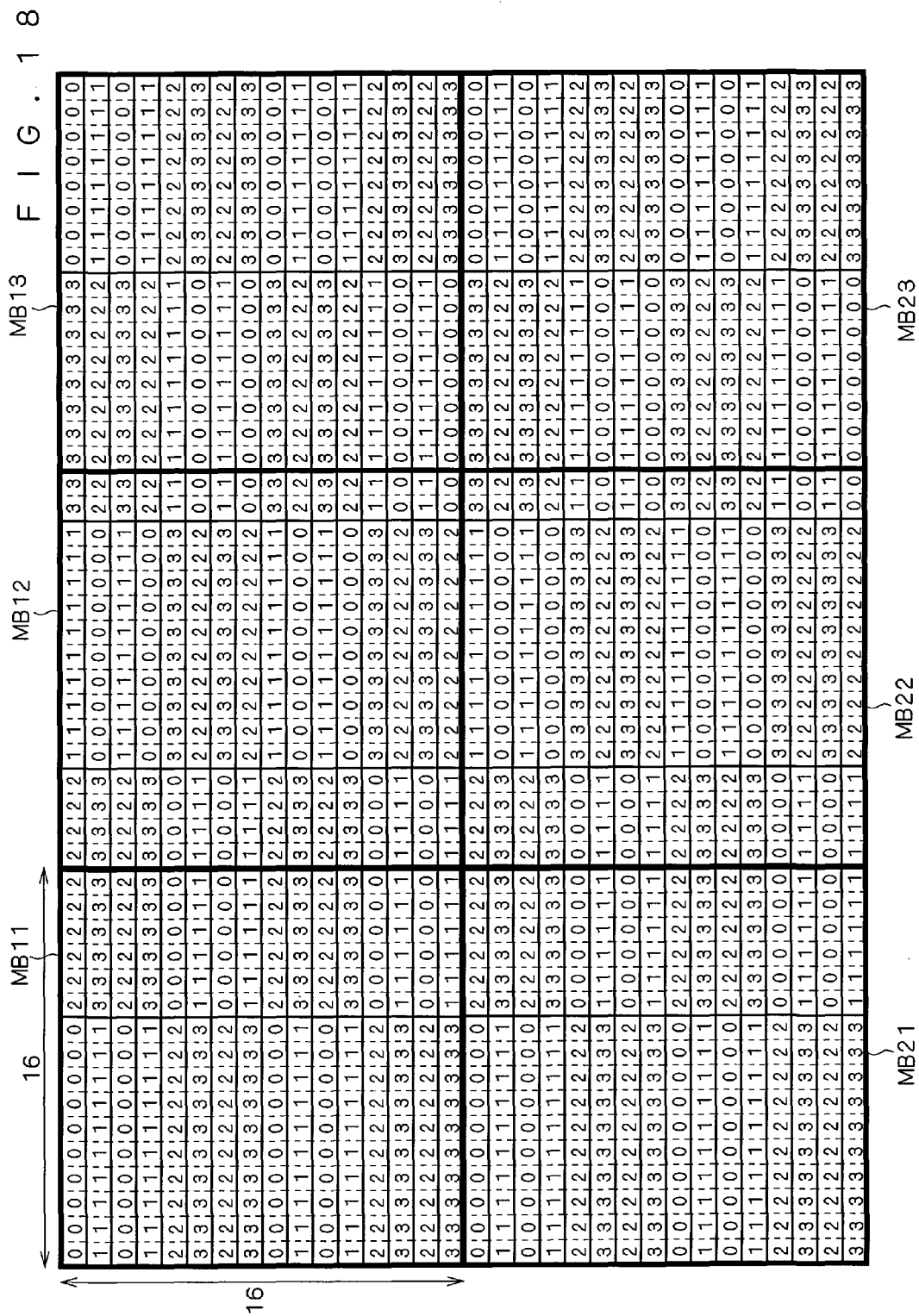

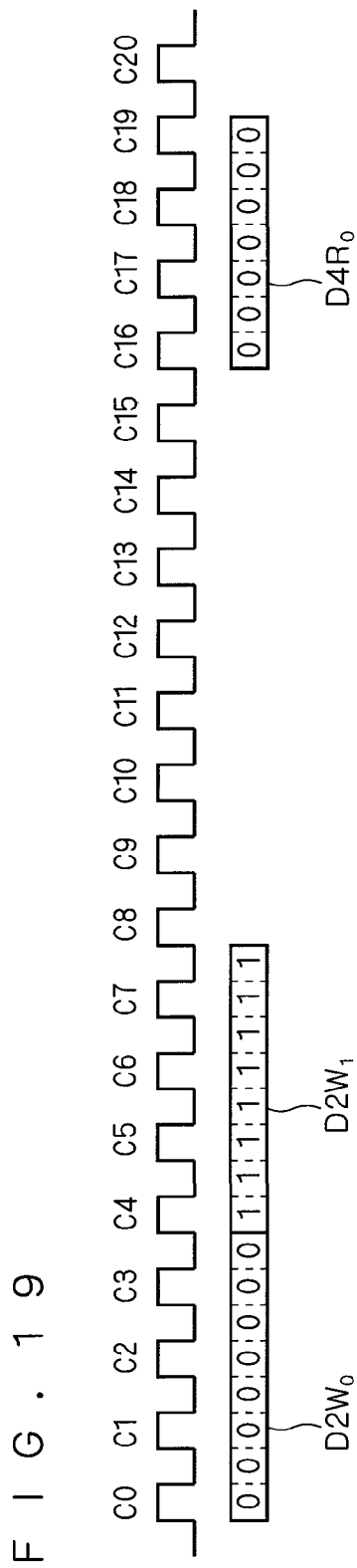

F I G . 2 0
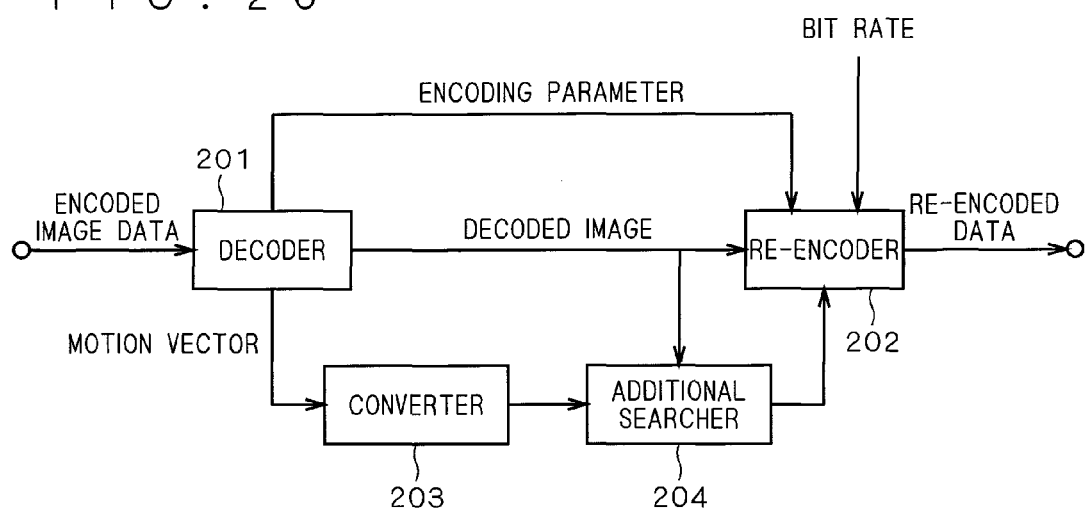

MEMORY ACCESS METHOD

TECHNICAL FIELD

The present invention relates to a memory access method, and particularly to a method of gaining access to a memory serving as a transcoder.

BACKGROUND ART

A conventional transcoder which re-encodes encoded image data into data having a different bit rate is disclosed in Patent Document 1 cited as follows. FIG. 20 is a block diagram showing a structure of the conventional transcoder disclosed in the following Patent Document 1. Referring to FIG. 20, a decoder 201 includes means for functioning to decode encoded image data and extract a first motion vector for each of small blocks of the decoded image data. A converter 203 includes means for functioning to reduce the first motion vectors and compute third motion vectors, means for functioning to recognize one of the third motion vectors included in one of the small blocks which is to be re-encoded, which vector has a norm which provides the smallest value when norms of other third motion vectors included in small blocks surrounding the one small block are added thereto, as a second motion vector, means for functioning to recognize the smallest value as an evaluation value, and means for functioning to determine an additional search field which is narrower as the accuracy of a motion vector represented by the evaluation value increases, for each of the small blocks, and to establish priorities in accordance with the evaluation value or the additional search fields. An additional searcher 204 additionally searches the additional search fields which are defined in association with priorities assigned thereto, respectively, according to the priorities, to obtain motion vectors for re-encoding.

Patent Document 1: Japanese Patent Application Laid-Open No. 2002-344971 (Abstract).

DESCRIPTION OF THE INVENTION

Problems to be Solved by the Invention

However, the conventional transcoder disclosed in the above-cited Patent Document 1 causes a problem that there is no countermeasure to cope with a case in which a memory for storing decoded image data output from the decoder 201 is formed of a memory which is required to provide an interval equal to or longer than a predetermined number of clock cycles between successive occurrences of access when the same bank is successively accessed, such as a double data rate (DDR) memory, for example.

The present invention has been made in order to solve the foregoing problem, and an object thereof is to obtain a memory access method intended for a memory which is required to provide an interval equal to or longer than a predetermined number of clock cycles between successive occurrences of access when the same bank is successively accessed, which method eliminates an idle time between the successive occurrences of access and allows for improvement in performance.

Means for Solving the Problems

A memory access method according to the first aspect of the present invention is intended for a memory which includes a plurality of banks including a first bank and a second bank and is required to provide an interval equal to or longer than a predetermined number of clock cycles between successive occurrences of access when the same bank is successively accessed, wherein two-dimensional image data which is to be written into the memory is divided into a plurality of data groups each having the amount of data that is transferable in a single burst transfer, and a process of writing the two-dimensional image data into the memory prevents successive occurrences of writing into the same bank by including, in the predetermined number of clock cycles, the steps of: (a) writing a first data group included in the plurality of data groups into the first bank; and (b) writing a second data group which is subsequent to the first data group into the second bank.

A memory access method according to the second aspect of the present invention, in the memory access method according to the first aspect, each of the first data group and the second data group is divided to be arranged into a plurality of rows of the two-dimensional image data stored in the memory, and the first data group is arranged in odd-numbered rows and the second data group is arranged in even-numbered rows.

A memory access method according to the third aspect of the present invention is intended for a memory which includes a plurality of banks including a first bank and a second bank and is required to provide an interval equal to or longer than a predetermined number of clock cycles between successive occurrences of access when the same bank is successively accessed, wherein two-dimensional image data stored in the memory is divided into a plurality of data groups each having the amount of data that is transferable in a single burst transfer to be read out from the memory, a process of reading out the two-dimensional image data from the memory prevents successive occurrences of readout from the same bank by including, in the predetermined number of clock cycles, the steps of: (a) reading out a first data group included in the plurality of data groups from the first bank; and (b) reading out a second data group which is subsequent to the first data group from the second bank.

A memory access method according to the fourth aspect of the present invention, in the memory access method according to the first or third aspect, a plurality of data groups included in a reference block which is a predicted destination of an observed block in the two-dimensional image data and another plurality of data groups included in a plurality of blocks which are defined adjacent to the reference block are read out from the memory successively, in order to extract a motion vector of the observed block.

A memory access method according to the fifth aspect of the present invention, in the memory access method according to the first or third aspect, when during progress of access to the first bank, not only a request for further access to the first bank but also a request for access to the second bank is made, the access to the second bank is attended preferentially to the further access to the first bank as requested.

A memory access method according to the sixth aspect of the present invention, in the memory access method according to the first or third aspect, data groups forming the two-dimensional image data are written into the memory such that a data set formed of n (n: the number of the plurality of banks) data groups which are respectively associated with different banks and arrayed in rows is repeatedly provided in each of rows of the two-dimensional image data stored in the memory.

Effects of the Invention

According to the memory access method according to the first aspect of the present invention, it is possible to successively write the first data group and second data group by switching between the first bank and second bank at a time of writing the two-dimensional image data into the memory. As a result, an idle time which is likely to be caused between successive occurrences of access can be eliminated or reduced, to thereby allow for improved performance.

According to the memory access method according to the second aspect of the present invention, it is possible to read out only data in the odd-numbered rows out of the two-dimensional image data by reading out the first data group from the memory. Also, it is possible to read out only data in the even-numbered rows out of the two-dimensional image data by reading out the second data group from the memory. As a result, it is possible to easily read out an image of an interlaced type.

According to the memory access method according to the third aspect of the present invention, it is possible to read out the first data group and the second data group successively by switching between the first bank and the second bank at a time of reading out the two-dimensional image data from the memory. As a result, an idle time which is likely to be caused between successive occurrences of access can be eliminated or reduced, to thereby allow for improved performance.

According to the memory access method according to the fourth aspect of the present invention, when a memory capable of performing a burst transfer to thereby achieve high-speed data transfer is employed, numerous data groups included in numerous blocks are transferred successively by a single operation, so that efficiency in data transfer can be enhanced as compared to a method in which a small number of data groups are transferred many times.

According to the memory access method according to the fifth aspect of the present invention, an idle time caused between successive occurrences of access to the first bank can be effectively used, to thereby shorten an entire process time as compared to a case in which the access to the second bank is gained after the further access to the first banks as requested is gained.

According to the memory access method according to the sixth aspect of the present invention, when the two-dimensional image data stored in the memory is read out by scanning the two-dimensional image data along rows, n data groups which are respectively associated with different banks are sequentially read out. As a result, an idle time which is likely to be caused between successive occurrences of access can be eliminated or reduced also in scanning along rows, to thereby allow for improved performance.

These and other objects, features, aspects and advantages of the present invention will become more apparent from the following detailed description of the present invention when taken in conjunction with the accompanying drawings.

BRIEF DESCRIPTION OF DRAWINGS

FIG. 3 is a schematic view for explaining a process of extracting the first motion vector in the motion searcher.

FIG. 4 is a schematic view for explaining a process of extracting the first motion vector in the motion searcher.

FIG. 18 is a view showing a modification of arrangement of two-dimensional image data stored in the memory.

FIG. 19 is a timing chart for explaining a process performed when an idle time is caused between successive occurrences of access.

FIG. 20 is a block diagram showing a structure of a conventional transcoder.

BEST MODE FOR CARRYING OUT THE INVENTION

Figure 1:
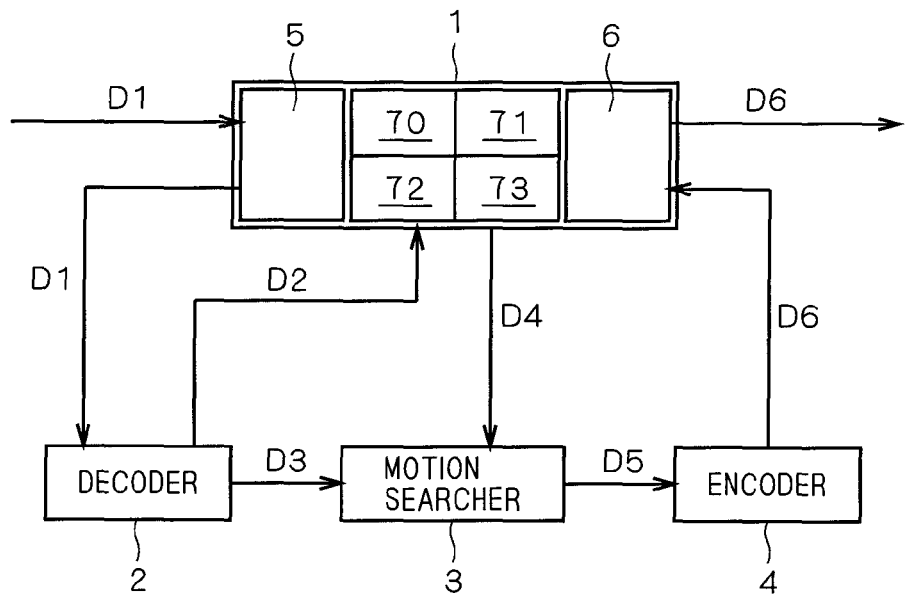
FIG. 1 is a block diagram showing a structure of a transcoder according to preferred embodiments of the present invention.

Hereinafter, preferred embodiments of the present invention will be described with reference to accompanying drawings. It is noted that the same reference numerals in different figures denote the same or corresponding elements.

FIG. 1 is a block diagram showing a structure of a transcoder according to preferred embodiments of the present invention. In the transcoder according to the preferred embodiments of the present invention, data which is encoded using MPEG-2 format is re-encoded into data in H.264 format, for example.

The transcoder includes a memory 1, a decoder 2, a motion searcher 3, and an encoder 4. The memory 1 includes a plurality of banks, and is required to provide an interval equal to or longer than a predetermined number of clock cycles (which will be hereinafter simply referred to as a "cycle") between successive occurrences of access when the same bank is successively accessed. For the transcoder according to the preferred embodiments of the present invention, it is assumed that a DDR2 which has a bus width of 32 bits and a burst length of 8 and includes four banks (the 0th bank 70, the first bank 71, the second bank 72, and the third bank 73) is employed as the memory 1. Having the bus width of 32 bits and the burst length of 8 allows the memory 1 to transmit 256 (=32×8) bits of data in a single burst transfer. Meanwhile, portions of a storage area of the memory 1 are allocated for buffer areas 5 and 6.

A bit stream of encoded data D1 which has been encoded using MPEG-2 format is written into the buffer area 5. It is assumed that the encoded data D1 is 8-bit YUV420 image data, for example, in the transcoder according to the preferred embodiments of the present invention. In data in 8-bit YUV420 format, an amount of data per pixel is twelve bits. It is additionally noted that the transcoder according to the preferred embodiments of the present invention is able to process image data in not only 8-bit YUV420 format but also another arbitrary format, of course.

The decoder 2 decodes the bit stream of the encoded data D1 which is read out from the buffer area 5 and outputs decoded data D2. The decoded data d2 is written into the memory 1, so that two-dimensional image data is stored in the memory 1. A sequence of writing the two-dimensional image data stored in the memory 1 and the decoded data D2 into the memory 1 will be later described in detail. Further, the decoder 2 extracts information about motion vectors included in the encoded data D1 and inputs the extracted information into the motion searcher 3, as data D3.

The motion searcher 3 reads out data D4 relating to reference blocks in the two-dimensional image data stored in the memory 1, based on the data D3. Then, the motion searcher 3 computes a motion vector of an observed block by a block matching method, to input the motion vector to the encoder 4, as data D5. Processes performed in the motion searcher 3 will be later described in detail.

The encoder 4 generates encoded data D6 by re-encoding the data D5 using H.264 format, and writes a bit stream of the encoded data D6 into the buffer area 6. The bit stream of the encoded data D6 is read out from the buffer area 6.

Additionally, the bit stream of the encoded data D1 may alternatively be input directly to the decoder 2 not via the buffer area 5, and also, the bit stream of the encoded data D6 may alternatively be output directly not via the buffer area 6.

<First Process in Motion Searcher 3>

Figure 2:
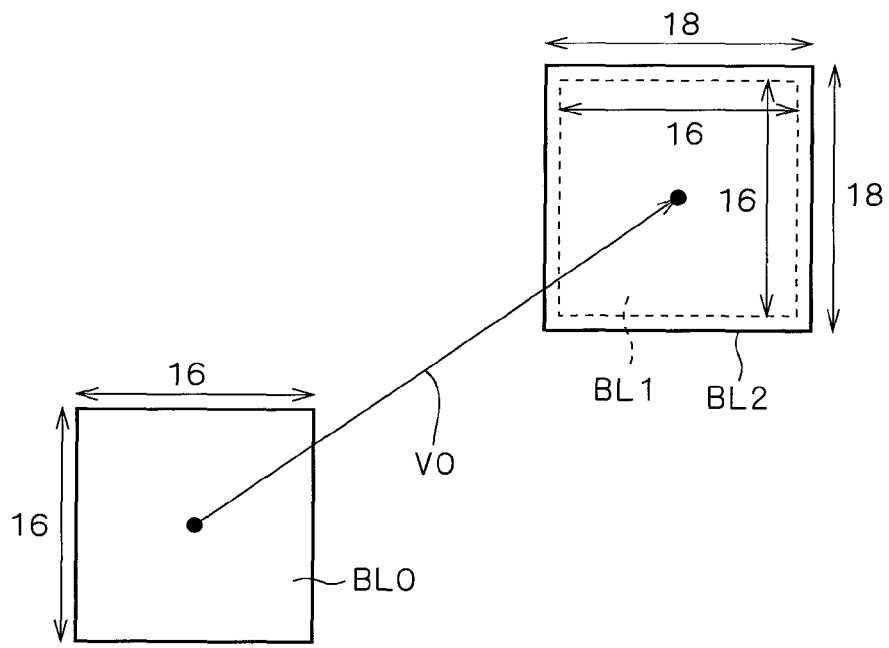
FIG. 2 is a schematic view for explaining a process of extracting a first motion vector in a motion searcher.

FIGS. 2, 3, and 4 are schematic views for explaining a process of extracting a first motion vector which is performed in the motion searcher 3. Referring to FIG. 2, the motion searcher 3 calculates a block BL1 (16 pixels wide by 16 pixels high) which is a predicted destination of an observed block BL0 (16 pixels wide by 16 pixels high) in the (n−1)th frame of two-dimensional image data, based on a location of the observed block BL0 in the nth frame of two-dimensional image data and the data D3 relating to a motion vector V0 which is input from the decoder 2. Next, the motion searcher 3 defines a reference block BL2 (18 pixels wide by 18 pixels high) which is centered on the block BL1 and is larger in size than the block BL1 by ±1 pixel in each of a vertical direction and a horizontal direction. Then, the motion searcher 3 reads out a portion of the data D4 which is associated with the reference block BL2 out of the (n−1)th frame of two-dimensional image data stored in the memory 1. A sequence of reading out the data D4 from the memory 1 will be later described in detail.

Referring to FIG. 3, the motion searcher 3 determines the degree of similarity between the observed block BL0 and each location within the reference block BL2 while gradually moving the observed block BL0, to find out a location which is the most similar to the observed block BL0 in the reference block BL2. For the determination of the degree of similarity, a well-known block matching method is employed, in which differences in pixel value between respective pixels in the observed block BL0 and respective pixels in the reference block BL2 are obtained, and the degree of similarity is determined based on a total sum of absolute values of the differences. In the present example, a location shown in FIG. 3 (an upper-left corner of the reference block BL2) is the most similar to the observed block BL0.

Next, the motion searcher 3 defines a reference block BL3 (18 pixels wide by 18 pixels high) which is centered on the observed block BL0 located at an upper-left corner in the reference block BL2 and is larger in size than the observed block BL0 by ±1 pixel in each of the vertical direction and the horizontal direction. Then, the motion searcher 3 reads out a portion of the data D4 which is associated with the reference block BL3 out of the (n−1)th frame of two-dimensional image data stored in the memory 1. Thereafter, in the same manner as described above, a location which is the most similar to the observed block BL0 in the reference block BL3 is found out by a block matching method. In FIG. 4, a location which is the most similar to the observed block BL0 in the reference block BL3 is extracted to be shown as a block BL4 (16 pixels wide by 16 pixels high).

Referring to FIG. 4, the motion searcher 3 divides the block BL4 into four small blocks BL4a, BL4b, BL4c, and BL4d (each of which is 8 pixels wide by 8 pixels high), and subsequently, defines a reference block BL5 (10 pixels wide by 10 pixels high) which is centered on the small block BL4a and is larger in size than the small block BL4a by ±1 pixel in each of the vertical direction and the horizontal direction. Then, the motion searcher 3 reads out a portion of the data D4 which is associated with the reference block BL5 out of the (n−1)th frame of two-dimensional image data stored in the memory 1. Thereafter, the motion searcher 3 determines the degrees of similarities by a block matching method in the same manner as described above, to obtain an optimal motion vector regarding the small block BL4a. The same processes as described above are performed on the other small blocks BL4b, BL4c, and BL4d, to find out respective optimal motion vectors regarding the small blocks BL4b, BL4c, and BL4d.

<Second Process in Motion Searcher 3>

Figure 5:
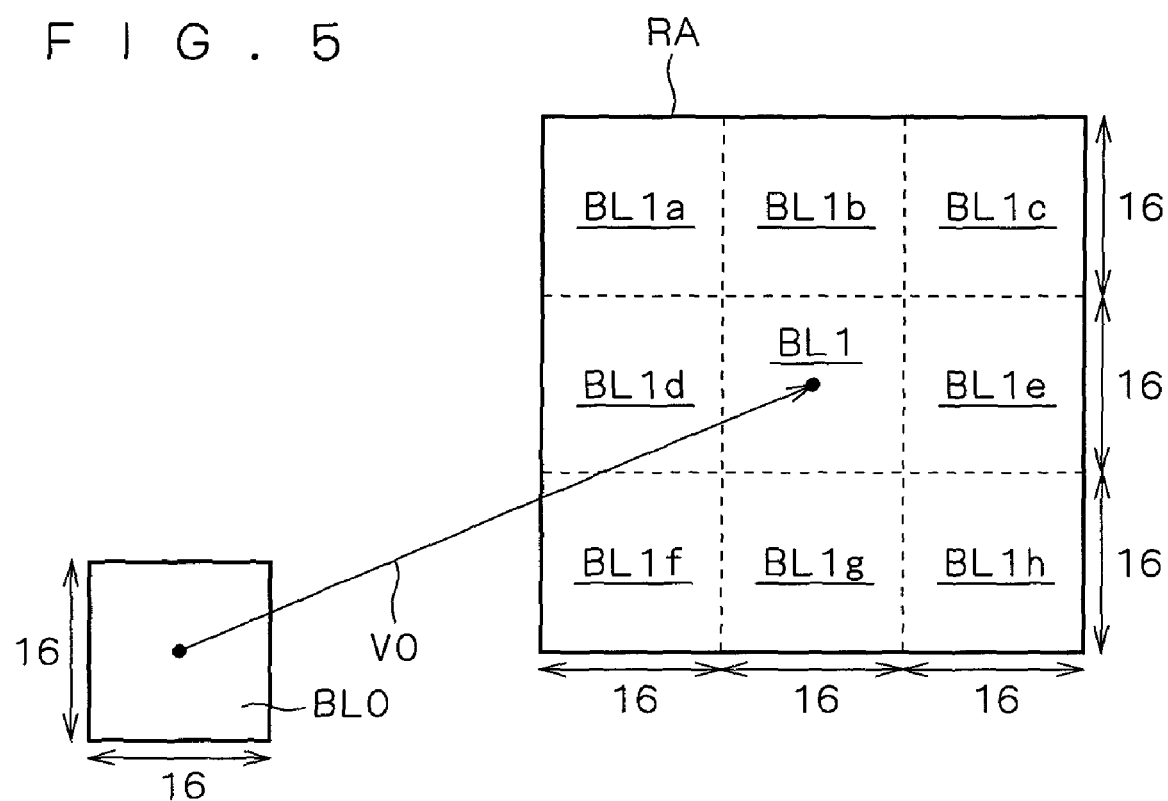
FIG. 5 is a schematic view for explaining a process of extracting a second motion vector in the motion searcher.

FIG. 5 is a schematic view for explaining a process of extracting a second motion vector in the motion searcher 3. First, the motion searcher 3 calculates the block BL1 which is a predicted destination of the observed block BL0 in the (n−1)th frame of two-dimensional image data based on a location of the observed block BL0 in the nth frame of two-dimensional image data and the data D3 relating to the motion vector V0 which is input from the decoder 2. Next, the motion searcher 3 defines blocks BL1a through BL1h (each of which is 16 pixels wide by 16 pixels high) which are adjacent to the block BL1 in vertical, horizontal, and diagonal directions. As a result, an area RA of 48 pixels wide by 48 pixels high which is centered on the block BL1 is defined. However, the size of the RA is not limited to the size of 48 pixels wide by 48 pixels high, and can be set to an arbitrary value by changing the sizes of the blocks BL1a through BL1h.

Subsequently, the motion searcher 3 reads out successively portions of the data D4 which are associated with the area RA out of the (n−1)th frame of two-dimensional image data stored in the memory 1. Then, the motion searcher 3 determines the degree of similarity between the observed block BL0 and each location in the area RA by a block matching method, while gradually moving the observed block BL0, to thereby find out a location which is the most similar to the observed block BL0 in the area RA. Thereafter, the motion searcher 3 divides the block which is the most similar to the observed block BL0 in the area RA into four small blocks, to obtain an optimal motion vector regarding each of the four small blocks in the same manner as in the process shown in FIG. 4.

<Read Characteristic and Write Characteristic of DDR2>

Figure 6:
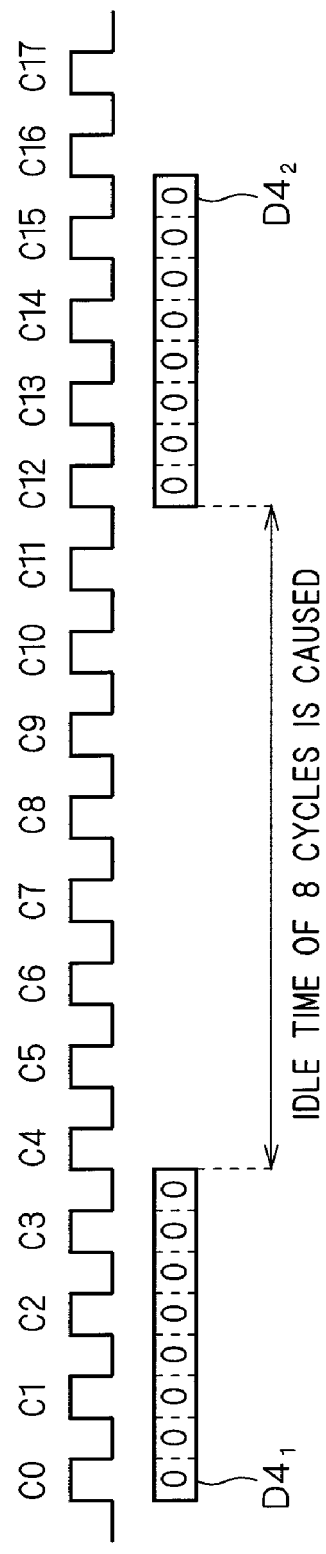
FIG. 6 is a timing chart for explaining read characteristic of a DDR2.

Below, read characteristic and write characteristic of the DDR2 employed as the memory 1 shown in FIG. 1 will be described. FIG. 6 is a timing chart for explaining read characteristic of the DDR2. In an example shown in FIG. 6, it is assumed that both of pieces of data $D4_1$ and $D4_2$ which should be read out in this order have been written into the 0th bank 70. In the DDR2, readout of data from the same bank is allowed once every twelve cycles, for example. More specifically, in the example shown in FIG. 6, since readout of the data $D4_1$ starts at a rising edge of a clock C0, readout of the data $D4_2$ which is subsequent to the readout of the data $D4_1$ should start at a rising edge of a clock C12. As a result, considering that the burst length is eight, an idle time of eight cycles, for example, is unavoidably caused between completion of the readout of the data $D4_1$ and start of the readout of the data $D4_2$.

Figure 7:
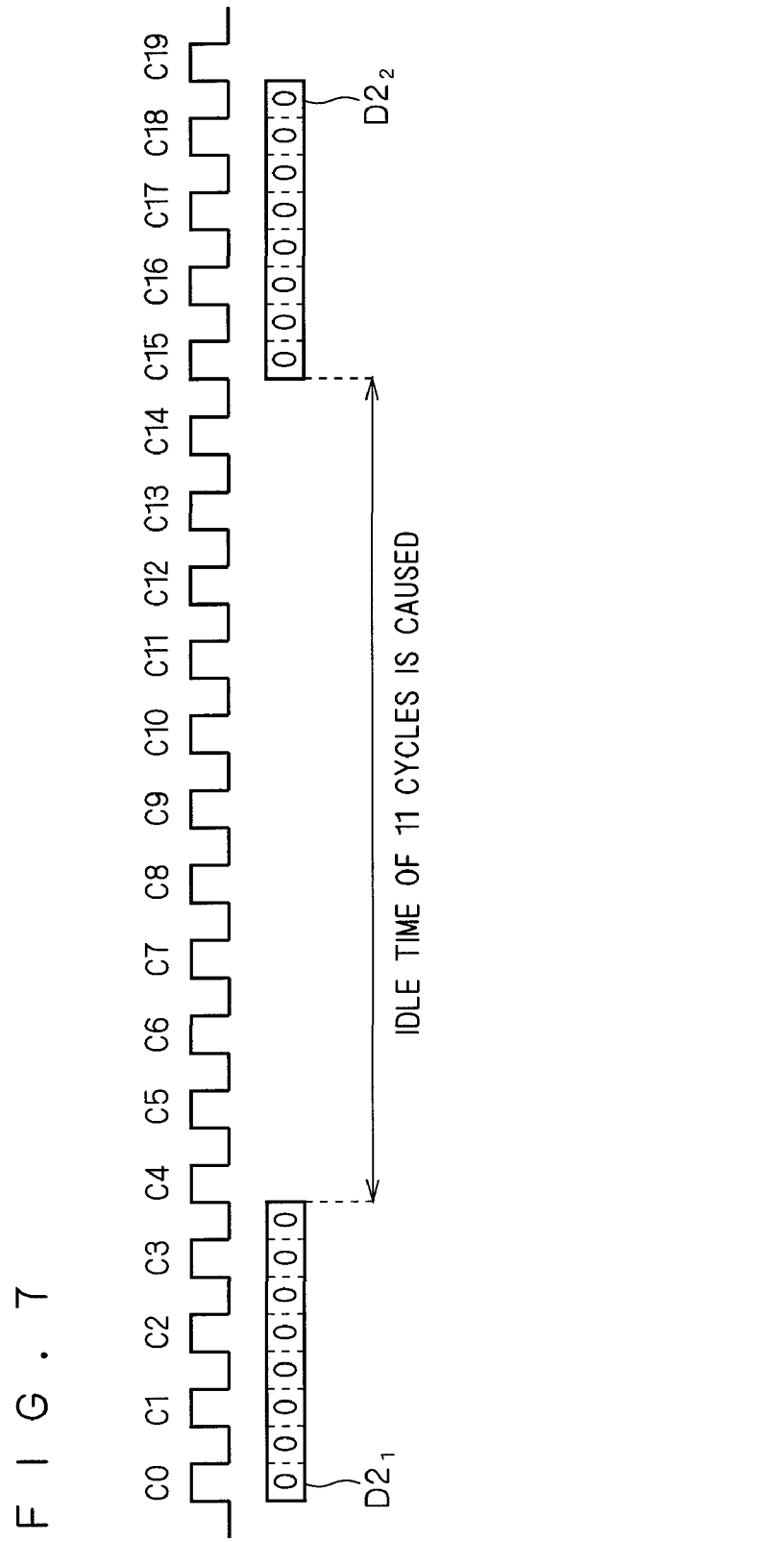
FIG. 7 is a timing chart for explaining write characteristic of the DDR2.

FIG. 7 is a timing chart for explaining write characteristic of the DDR2. In an example of FIG. 7, it is assumed that both of pieces of data $D2_1$ and $D2_2$ which should be written in this order are to be written into the 0th bank 70. In the DDR2, writing of data into the same bank is allowed once every 15 cycles, for example. More specifically, in the example shown in FIG. 7, since writing of the data $D2_1$ starts at a rising edge of a clock C0, writing of the data $D2_2$ which is subsequent to the writing of the data $D2_1$ should start at a rising edge of a clock C15. As a result, considering that the burst length is eight, an idle time of 11 cycles, for example, is unavoidably caused between completion of the writing of the data $D2_1$ and start of the writing of the data $D2_2$.

Further, in a case in which the same bank is successively accessed for achieving readout and writing in this order in the DDR2, an idle time of seven cycles, for example, is unavoidably caused, and, in a case in which the same bank is successively accessed for achieving writing and readout in this order in the DDR2, an idle time of 12 cycles, for example, is unavoidably caused, though such cases are not shown in FIGS. 6 and 7.

In view of this, in the transcoder according to the preferred embodiments of the present invention, a sequence of writing the decoded data D2 into the memory 1 and a sequence of reading out the data D4 from the memory 1 are determined as follows so that no idle time is caused between successive occurrences of access.

<Sequence of Writing Data into Memory 1>

Figure 8:
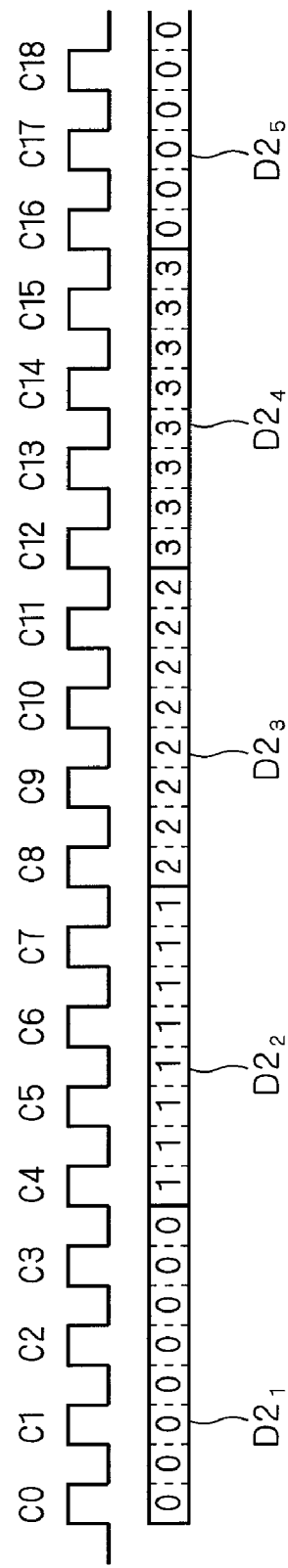
FIG. 8 is a timing chart for explaining a sequence of writing decoded data into a memory.

First, a sequence of writing the decoded data D2 which is output from the decoder 2 to the memory 1 will be described. FIG. 8 is a timing chart for explaining a sequence of writing the decoded data D2 into the memory 1. Referring to FIGS. 1 and 8, pieces of data $D2_1$, $D2_2$, $D2_3$, $D2_4$, $D2_5$, . . . which should be written in this order are written into the 0th bank 70, the first bank 71, the second bank 72, the third bank 73, the 0th bank 70, . . . , respectively, in the transcoder according to the preferred embodiments of the present invention. Since different banks are successively accessed, no idle time is caused between writing of the data $D2_1$ and writing of the data $D2_2$, between writing of the data $D2_2$ and writing of the data $D2_3$, between writing of the data $D2_3$ and writing of the data $D2_4$, or between writing of the data $D2_4$ and writing of the data $D2_5$. Also, though both of the data $D2_1$ and the data $D2_5$ are written into the 0th bank, each of the burst length of the pieces of the data $D2_1$, the data $D2_2$, the data $D2_3$, and the data $D2_4$ is eight, so that an interval of 16 cycles which is longer than 15 cycles is provided between start of the writing of the data $D2_1$ and start of the writing of the data $D2_5$. Accordingly, no idle time is caused also between completion of the writing of the data $D2_1$ and start of the writing of the data of $D2_5$.

As described above, in the transcoder according to the preferred embodiments of the present invention, even though the DDR2 is employed as the memory 1, an idle time which is likely to be caused during writing of the decoded data D2 which is transferred from the decoder 2 into the memory 1 can be eliminated or reduced, to thereby allow for improvement in performance.

FIGS. 9 through 15 are views for explaining a process of mapping the decoded data D2 into the memory 1 step by step. In an example shown in FIGS. 9 through 15, only six macro blocks MB11, MB12, MB13, MB21, MB22, and MB23 (each of which is 16 pixels wide by 16 pixels high) which are arranged in two rows and three columns are shown as representative blocks for the purposes of simplifying illustration. Additionally, 256 bits of data can be transferred in a single burst transfer and an amount of data per pixel is twelve bits, so that data corresponding to 21 pixels can be transferred at maximum in a single burst transfer. However, since an even number of pixels can be treated easier than an odd number of pixels, it is assumed that data corresponding to 20 pixels are transferred in a single burst transfer in the transcoder according to the preferred embodiments of the present invention.

Figure 9:
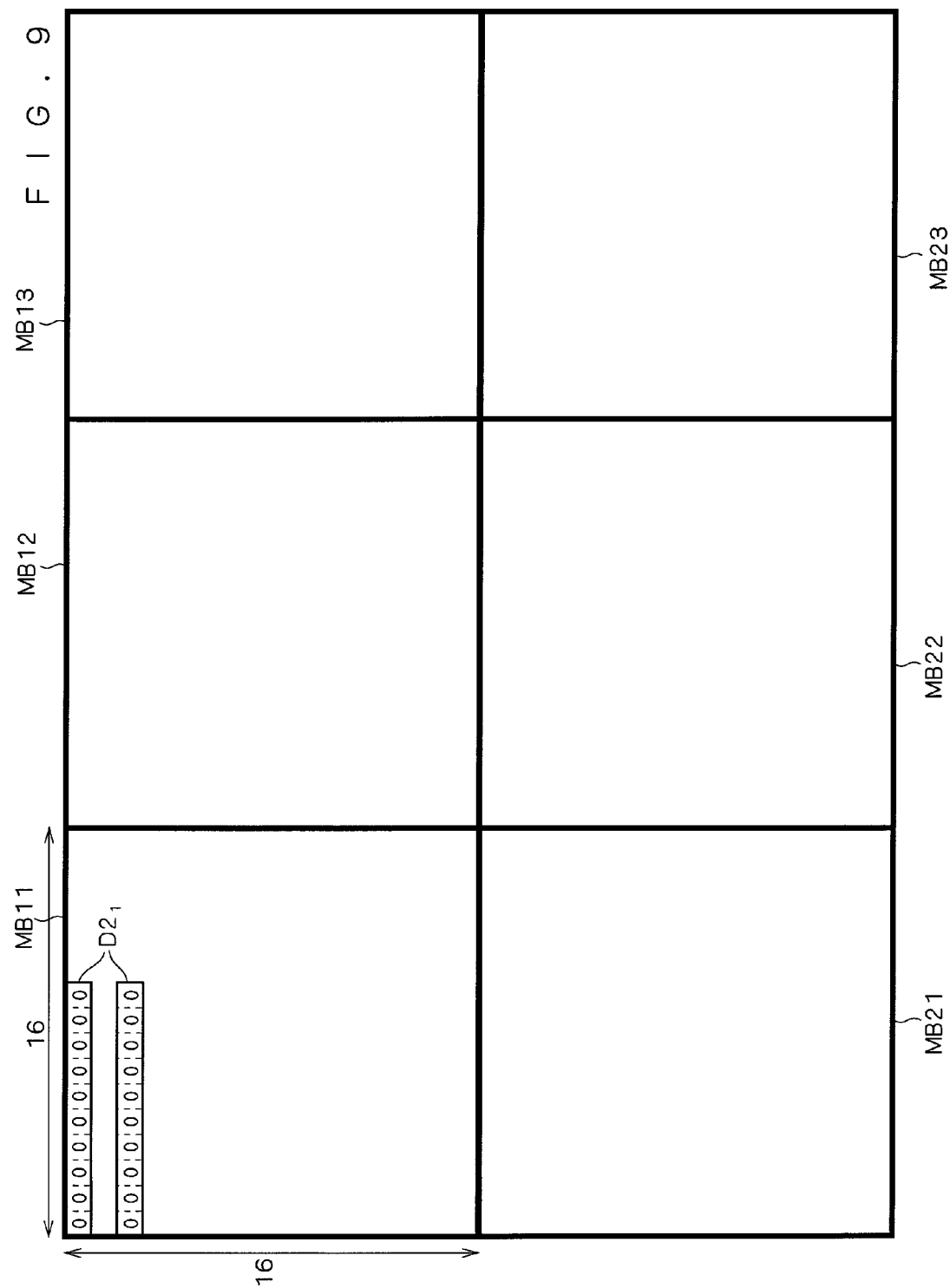
FIG. 9 is a view for explaining a process of mapping decoded data into the memory step by step.

Referring to FIG. 9, first, the data $D2_1$ corresponding to 20 pixels which is to be written into the 0th bank 70 is divided into two groups each including data corresponding to ten pixels, which are then arranged in the first through tenth columns on the first row and in the first through tenth columns on the third row of the macro block MB11, respectively. It is additionally noted that a number noted within each of pixels in the drawings indicates a number of a bank into which data of the pixel is to be written.

Figure 10:
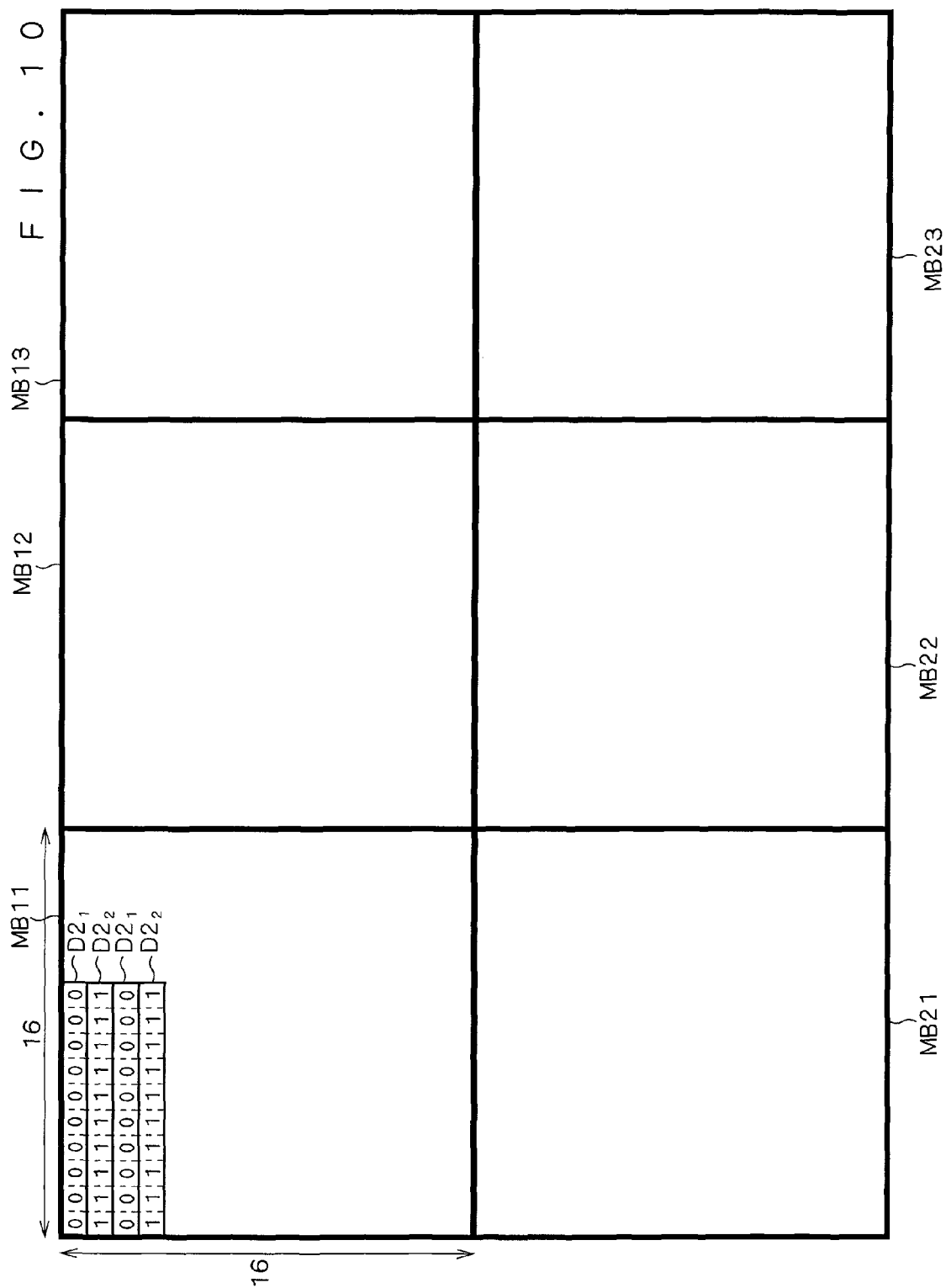
FIG. 10 is a view for explaining the process of mapping decoded data into the memory step by step.

Referring to FIG. 10, subsequently, the data $D2_2$ corresponding to 20 pixels which is to be written into the first bank 71 is divided into two groups each including data corresponding to ten pixels, which are then arranged in the first through tenth columns on the second row and in the first through tenth columns on the fourth row of the macro block MB11, respectively, in the same manner as describe above.

Figure 11:
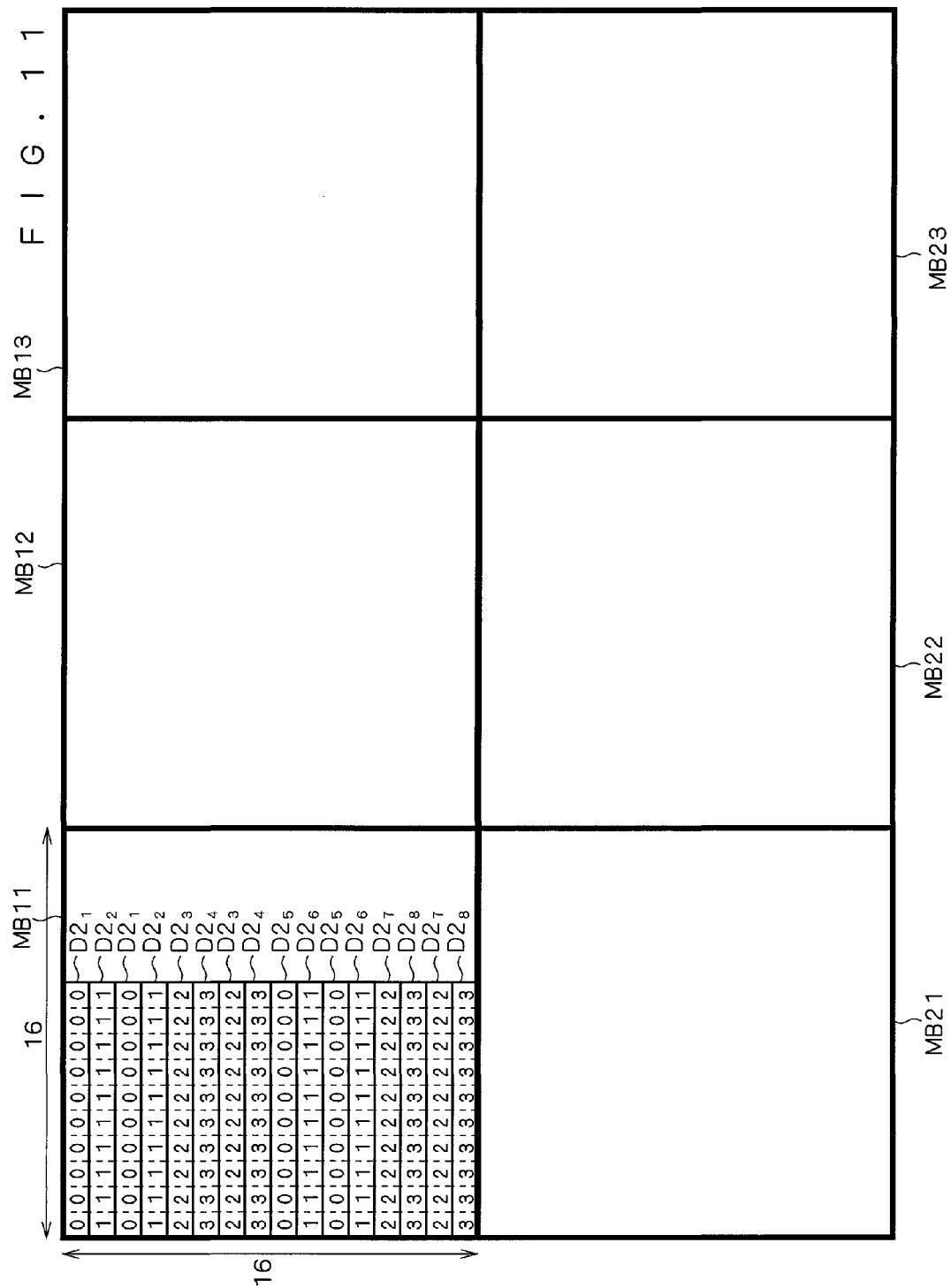
FIG. 11 is a view for explaining the process of mapping decoded data into the memory step by step.

Writing progresses downwardly in the presence of change of a bank, and the same processes performed on the data $D2_1$ and the data $D2_2$ are performed on pieces of data $D2_3$ through data $D2_8$, so that arrangement of data in the first through tenth columns on each of the first through sixteenth rows of the macro blocks MB11 is completed, as shown in FIG. 11.

Figure 12:
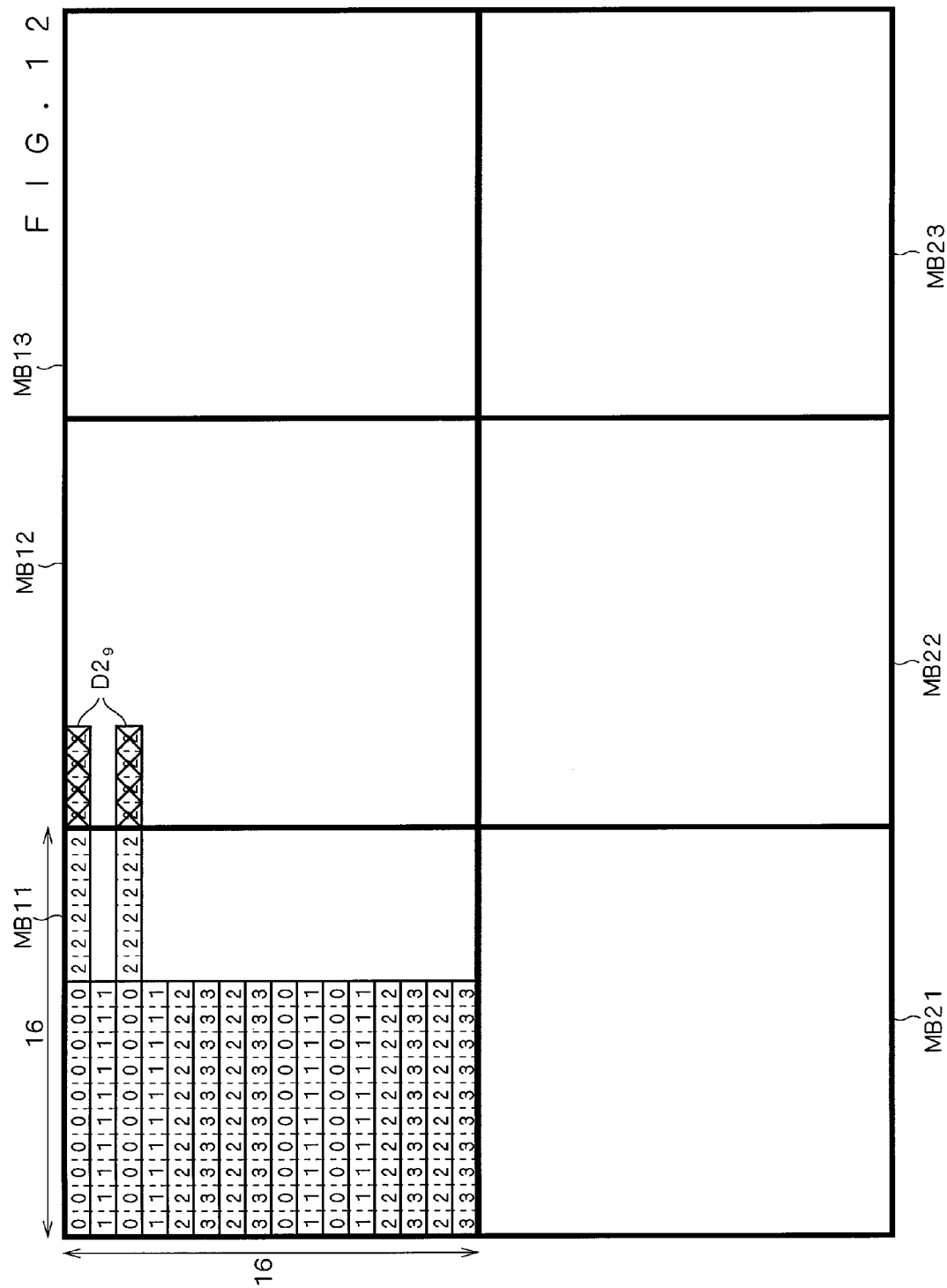
FIG. 12 is a view for explaining the process of mapping decoded data into the memory step by step.
Figure 13:
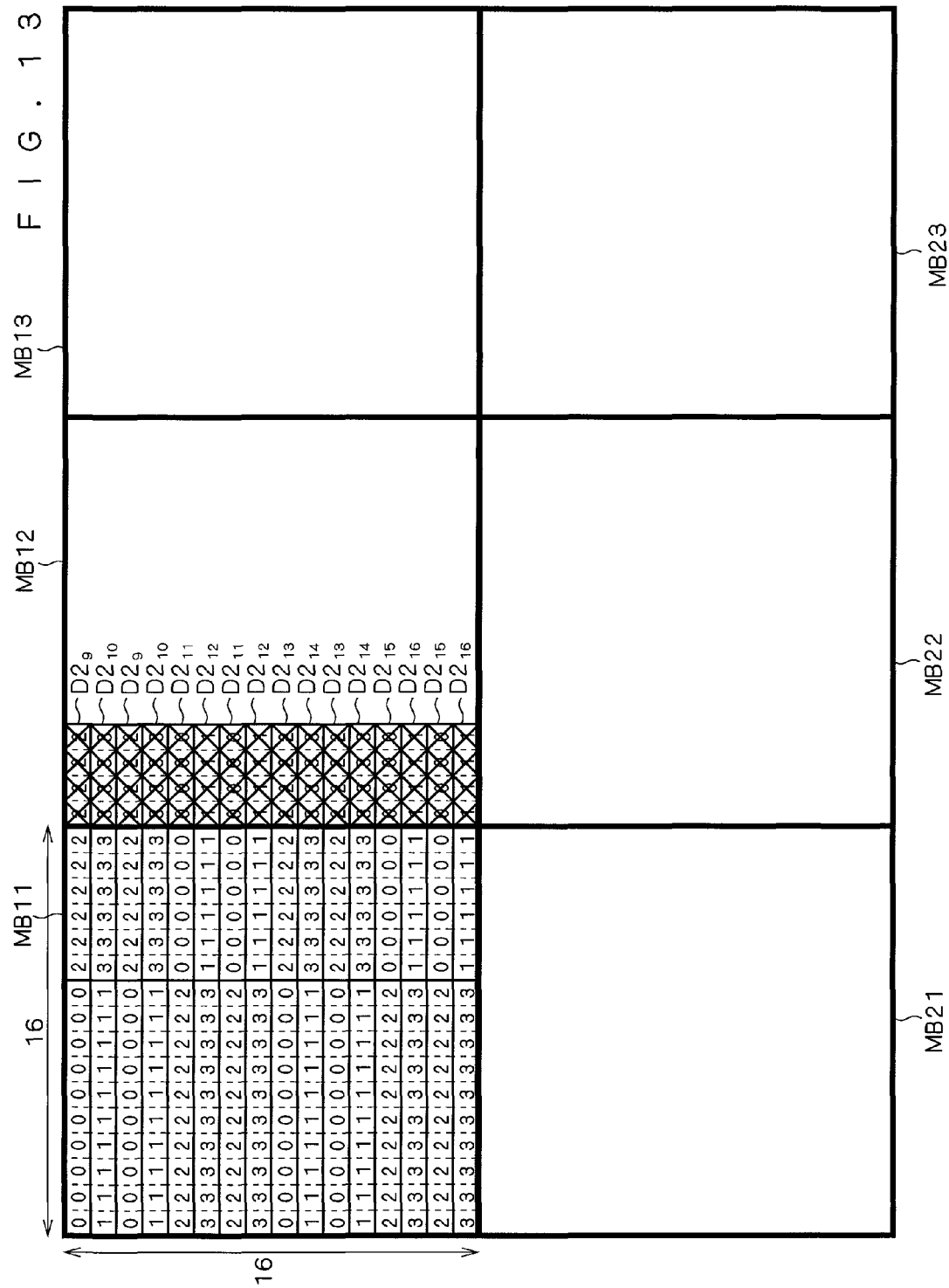
FIG. 13 is a view for explaining the process of mapping decoded data into the memory step by step.

Referring to FIG. 12, data $D2_9$ corresponding to 20 pixels which is to be written into the second bank 72 is divided into two groups each including data corresponding to 10 pixels, which are then arranged in the eleventh through sixteenth columns on the first row and in the eleventh through sixteenth columns on the third row of the macro block MB11, respectively, in the same manner as described above. Additionally, masking is performed on a macro block MB12, to thereby prevent portions marked with "X" in the data $D2_9$ in FIG. 12 from being written into the macro block MB12.

The same processes performed on the data $D2_9$ are performed on pieces of data $D2_{10}$ through $D2_{16}$, so that arrangement of data in the eleventh through sixteenth columns on each of the first through sixteenth rows of the macro block MB11 is completed. In other words, writing of data into the macro block MB11 is completed.

Figure 14:
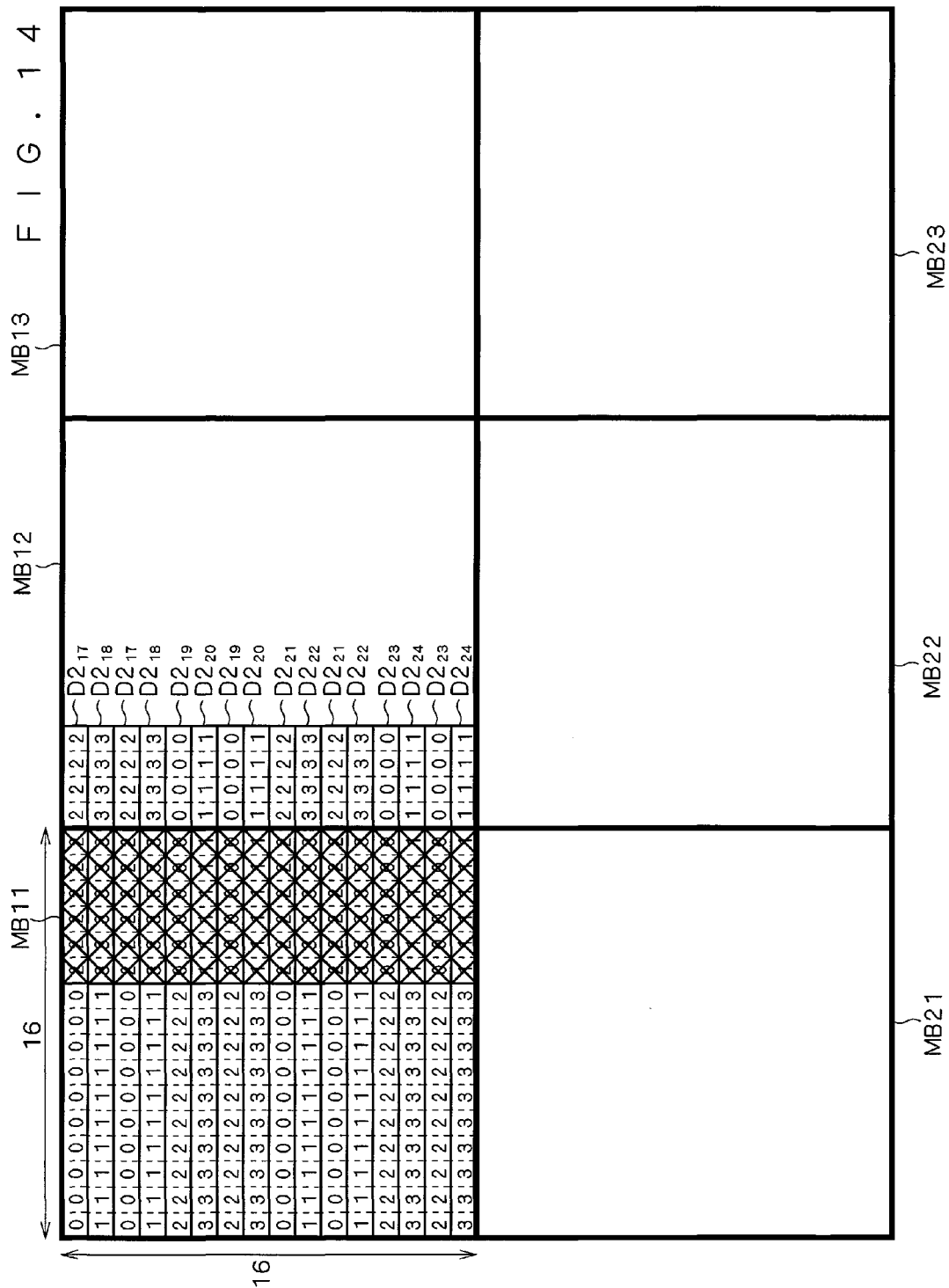
FIG. 14 is a view for explaining the process of mapping decoded data into the memory step by step.

Referring to FIG. 14, subsequently, the same processes performed on the pieces of the data $D2_9$ through $D2_{16}$ are performed on pieces of data $D2_{17}$ though $D2_{24}$, so that arrangement of data in the first through fourth columns on each of the first through sixteenth rows of the macro block MB12 is completed as shown in FIG. 14. Additionally, masking is performed on the macro block MB11, to thereby prevent portions marked with "X" in each of the pieces of the data $D2_{17}$ through $D2_{24}$ in FIG. 14 from being written into the macro block MB11.

Figure 15:
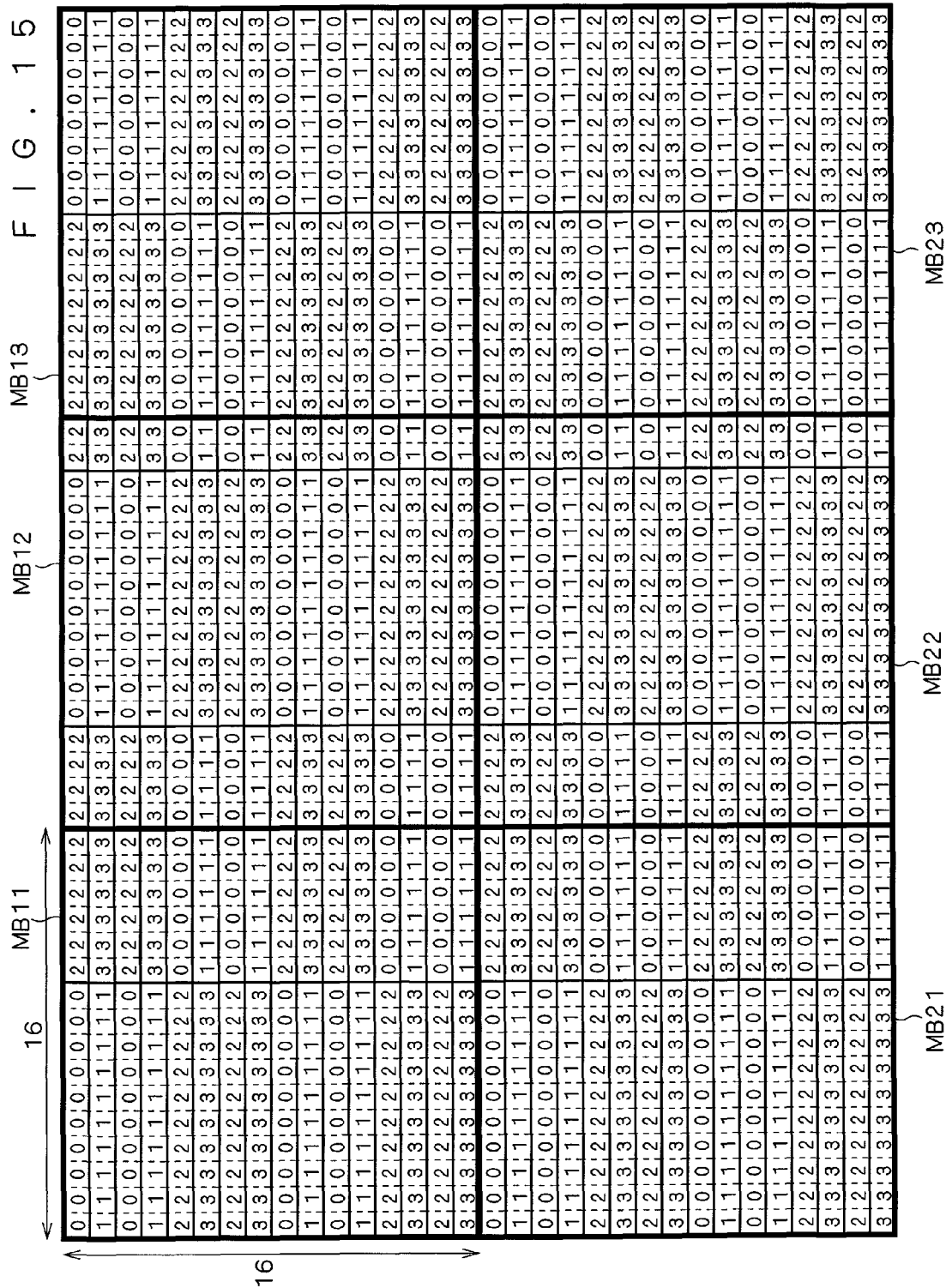
FIG. 15 is a view for explaining the process of mapping decoded data into the memory step by step.

Thereafter, the same processes as described above are repeated, so that writing progresses from the macro block MB12, to the macro block MB13, to the macro block MB21, to the macro block MB22, and to the macro block MB23. Finally, two-dimensional image data shown in FIG. 15 is obtained.

<Sequence of Reading Data from Memory 1>

Figure 16:
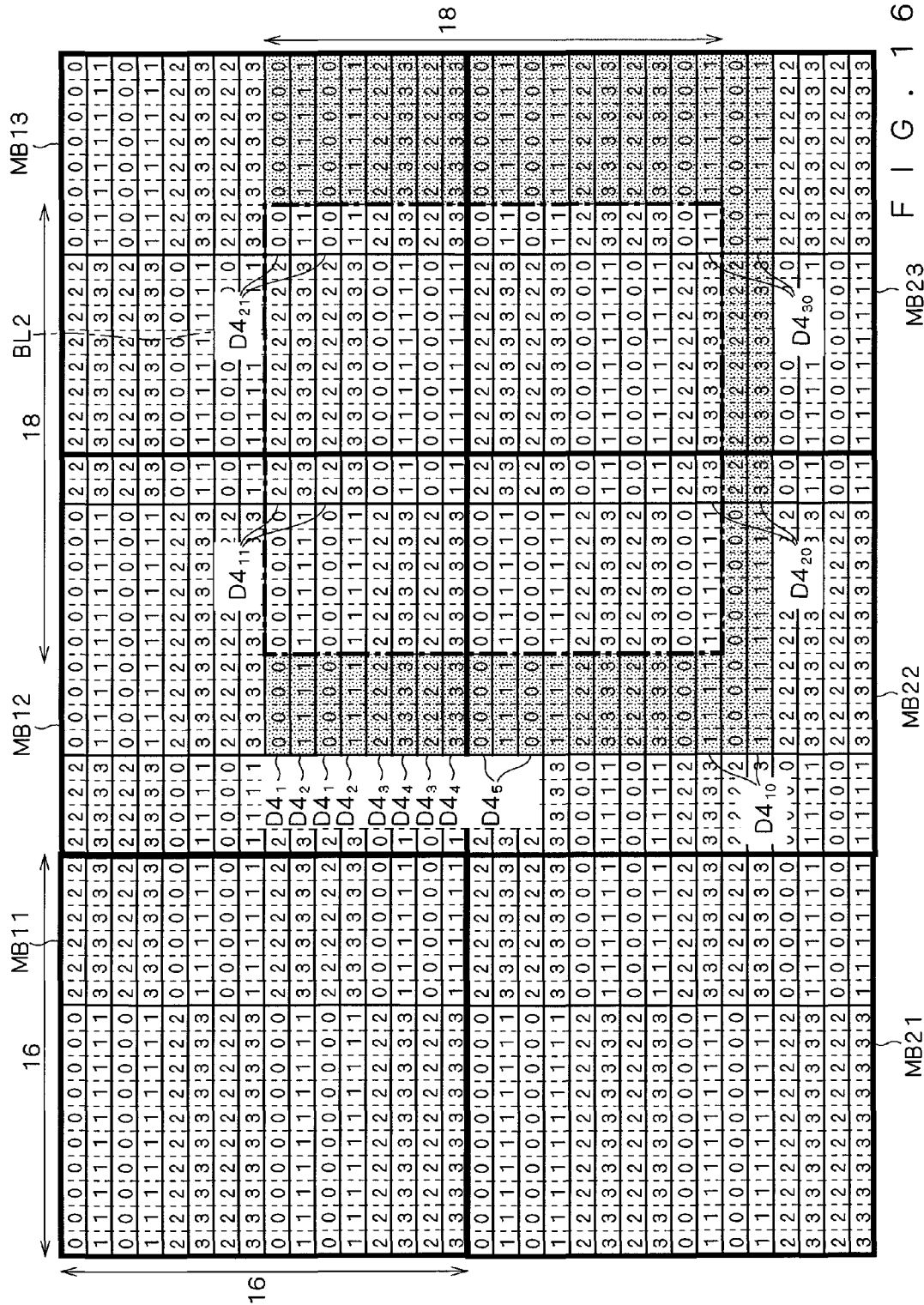
FIG. 16 is a view showing two-dimensional image data stored in the memory.

Next, a sequence of reading out the data D4 from the memory 1 in the motion searcher 3 will be described. FIG. 16 shows two-dimensional image data stored in the memory 1, which corresponds to the two-dimensional image data shown in FIG. 15. In the following description, it is assumed that the reference block BL2 is defined in a position indicated by alternate long and short dashed lines in FIG. 16. Also, though only a read operation in a case in which the motion searcher 3 performs a process of extracting a first motion vector (refer to FIGS. 2, 3, and 4) will be treated in the following description, a substantially same operation will be performed even in a case in which the motion searcher 3 performs a process of extracting a second motion vector (refer to FIG. 5).

First, data $D4_1$ corresponding to 20 pixels which is arranged in the fifth through fourteenth columns on the ninth row and in the fifth through fourteenth columns on the eleventh row of the memory block MB12 is read out from the 0th bank 70. Subsequently, data $D4_2$ corresponding to 20 pixels which is arranged in the fifth through fourteenth columns on the tenth row and in the fifth through fourteenth columns on the twelfth row of the memory block MB12 is read out from the first bank 71. Likewise, readout progresses downwardly in the presence of change of a bank, so that pieces of data $D4_3$, $D4_4$, $D4_5$, ... $D4_{10}$ are read out in this order. Thereafter, with change of a row, pieces of data $D4_{11}$ through $D4_{20}$ are read out in this order, and with further change of a row, pieces of data $D4_{21}$ through $D4_{30}$ are read out in this order.

Figure 17:
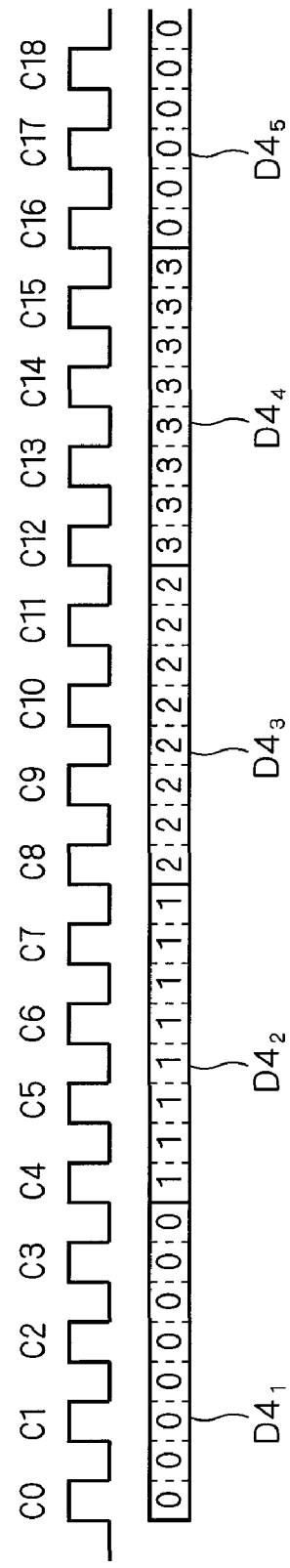
FIG. 17 is a timing chart for explaining a sequence of reading out data from the memory.

FIG. 17 is a timing chart for explaining a sequence of reading out the data D4 from the memory 1. In the transcoder according to the preferred embodiments of the present invention, the pieces of data $D4_1$, $D4_2$, $D4_3$, $D4_4$, $D4_5$, ... which should be read out in this order have been written into the 0th bank 70, the first bank 71, the second bank 72, the third bank 73, the 0th bank 70, ..., respectively. As such, since different banks are successively accessed for readout, no idle time is caused between readout of the data $D4_1$ and readout of the data $D4_2$, between readout of the data $D4_2$ and readout of the data $D4_3$, between readout of the data $D4_3$ and readout of the data $D4_4$, or between readout of the data $D4_4$ and readout of the data $D4_5$. Also, though both of the data $D4_1$ and the data $D4_5$ are read out from the 0th bank, the burst length of each of the pieces of the data $D4_1$, the data $D4_2$, the data $D4_3$, and the data $D4_4$ is eight, so that an interval of 16 cycles which is longer than 12 cycles is provided between start of the readout of the data $D4_1$ and start of the readout of the data $D4_5$. Accordingly, no idle time is caused also between completion of the readout of the data $D4_1$ and start of the readout of the data of $D4_5$.

As described above, in the transcoder according to the preferred embodiments of the present invention, even though the DDR2 is employed as the memory 1, an idle time which is likely to be caused when the motion searcher 3 reads out the data D4 from the memory 1 can be eliminated or reduced, to thereby allow for improvement in performance.

Additionally, referring to FIG. 16, in a case in which the reference block BL2 of an interlaced type is required, such requirement can be met by reading out the data D4 in an order; the data $D4_1$, $D4_3$, $D4_5$, ... $D4_{29}$. For example, the data $D4_1$ is divided into two groups each including data corresponding to 10 pixels, and the data corresponding to 10 pixels is arranged on odd-numbered rows of two-dimensional image data. As such, to read out the data $D4_1$ automatically results in readout of data on two odd-numbered rows, so that the reference block BL2 of an interlaced type can be easily obtained.

Also, portions which are shaded to look like sandy soil in FIG. 16, out of the data $D4_1$ through $D4_{30}$, are located outside of the reference block BL2, which means that the shaded portions include data which need not be read out primarily. Nonetheless, since the transcoder according to the preferred embodiments of the present invention is intended to perform a burst transfer in which a group of data corresponding to 20 pixels is considered as one unit, also such unnecessary data as noted above is read out from the memory 1 and transferred to the motion searcher 3.

Also in readout of data in the reference block BL3 shown in FIG. 3 from the memory 1, unnecessary data is transferred to the motion searcher 3 in the same manner as in readout of data in the reference block BL2. As such, when the processes shown in FIGS. 2, 3, and 4 are performed, a proportion of an amount of unnecessary data to a total amount of data transferred to the motion searcher 3 from the memory 1 is large.

On the other hand, the processes shown in FIG. 5 prevent unnecessary data from being provided on boundaries between adjacent ones of the blocks BL1 and BL1a through BL1h, allowing provision of unnecessary data only in a peripheral portion of the area RA. Accordingly, a proportion of an amount of unnecessary data to a total amount of data transferred to the motion searcher 3 from the memory 1 is smaller than that in a case in which the processes shown in FIGS. 2, 3, and 4 are performed.

Also, since the DDR2 is capable of performing a burst transfer to achieve a high-speed data transfer, the processes shown in FIG. 5 in which a large amount of data is transferred at a single time provide higher efficiency in data transfer than the processes shown in FIGS. 2, 3, and 4 in which a small amount of data is transferred many times.

<Modification of Arrangement of Two-Dimensional Image Data>

FIG. 18 is a view for showing a modification of arrangement of two-dimensional image data stored in the memory 1. In the example shown in FIG. 15, odd-numbered rows are associated with the 0th bank 70 or the second bank 72 and even-numbered rows are associated with the first bank 71 or the third bank 73 anywhere in two-dimensional image data. In contrast thereto, in the two-dimensional image data shown in FIG. 18, in half of all columns, odd-numbered rows and even-numbered rows are respectively associated with the banks numbered differently from those in the two-dimensional image data shown in FIG. 15. More specifically, in the example shown in FIG. 18, in the fifth through sixteenth columns of each of the memory blocks MB12 and MB22 and in the first through eighth columns of each of the memory blocks MB13 and MB23, odd-numbered rows are associated with the first bank 71 and the third bank 73 and even-numbered rows are associated with the 0th bank 70 and the second bank 72 in a reverse manner with respect to the example shown in FIG. 15.

As a result, referring to the first row of the two-dimensional image data shown in FIG. 18, for example, the first ten columns including a pixel at the left end on the first row are associated with the 0th bank 70, next ten columns on the first row are associated with the first bank 71, further next ten columns on the first row are associated with the second bank 72, and even further next ten columns on the first row are associated with the third bank 73. In other words, a data set composed of successive 40 columns on a single row includes data which are associated with all of the 0th bank 70, the first bank 71, the second bank 72, and the third bank 73. Then, since the number of macro blocks is great actually, a data set composed of the foregoing 1 row by 40 columns (that is, a data set including data associated with all the banks) is provided repeatedly on the first row of the two-dimensional image data. The above description has been made by taking the first row of two-dimensional image data as an example, and the same will hold true for all of the second and subsequent rows.

In order to read out the two-dimensional image data shown in FIG. 18 by raster scan, when the first row of the two dimensional data is scanned from the left edge thereof toward the right edge thereof, for example, the 0th bank 70, the second bank 72, the first bank 71, and the third bank 73 are accessed by turns in this order. In other words, four banks are sequentially accessed and data is read out therefrom. Accordingly, no idle time is provided between successive occurrences of access also in reading out data by raster scan in the same manner as in the example shown in FIG. 17. Thus, the two-dimensional image data shown in FIG. 18 is particularly advantageous in a case in which two-dimensional image data stored in the memory 1 needs to be displayed on a display device (not shown) after raster scan.

<Interrupt Handling During Idle Time>

FIG. 19 is a timing chart for explaining processes performed when an idle time is caused between successive occurrences of access. FIG. 19 shows a case in which a request for access for reading out data $D4R_0$ from the 0th bank 70 is made during the progress of access to the 0th bank 70 for writing data $D2W_0$, as one example. As described above, in the DDR2, in order to gain access for readout and access for writing to the same bank successively in this order, an idle time of 12 cycles is unavoidably caused. To apply this to the example shown in FIG. 19, since writing of the data $D2W_0$ starts at a rising edge of a clock C0, readout of the data $D4R_0$ should start at a rising edge of a clock C16.

In the foregoing situation, if not only a request for access to the 0th bank 70 for reading out the data $D4R_0$ but also a request for access to the other bank than the 0th bank 70 is made, the request for access to the other bank is preferentially addressed. For example, when a request for access to the first bank 71 for writing data $D2W_1$ is made, the data $D2W_1$ is written into the first bank 71 after writing of the data $D2W_0$ into the 0th bank is completed, and thereafter, the data $D4R_0$ is read out from the 0th bank 70, as shown in FIG. 19.

In this manner, it is possible to effectively use an idle time, to thereby shorten an entire process time as compared to a case in which the data $D2W_1$ is written after the data $D4R_0$ is read out.

The above description has dealt with effective use of an idle time in a case in which access for writing and access for readout to the same bank are gained successively in this order. However, also in a case in which the same bank is successively accessed for achieving readout plural times, or in a case in which the same bank is successively accessed for achieving readout and writing in this order, it is possible to effectively use an idle time by preferentially addressing a request for access to the other bank in the same manner as described above.

Below, details of processes which are preferentially performed when an idle time is caused, together with priorities, will be described.

The transcoder according to the preferred embodiments of the present invention has a function of reading out two-dimensional image data stored in the memory 1 and displaying an image on a display device (not shown). A process of reading out two-dimensional image data in order to display an image requires real-time control. Hence, when an idle time is caused, the foregoing process (i.e., the process of reading out two-dimensional image data for displaying it) is performed as a matter of highest priority. That is, the first priority is assigned to the process of reading out two-dimensional image data for displaying it.

The data D4 in the reference block BL2 or BL3 (refer to FIG. 3) or the area RA (refer to FIG. 5) which is read out from the memory 1 by the motion searcher 3 includes a large amount of data. Also, there is a need of rapidly transferring the data D4 from the memory 1 to the motion searcher 3 in order to allow the motion searcher 3 to rapidly proceed with a process therein. Thus, when an idle time is caused, after the foregoing process of reading out two-dimensional image data for displaying it is finished, a process of reading out the data D4 is preferentially performed. That is, the second priority is assigned to the process of reading out the data D4.

Referring to FIG. 1, the encoded data D1 has a small amount of data because the data D1 has been encoded using MPEG-2 format. Also, there is a need of minimizing the number of switching between access for readout to the memory 1 and access for writing to the memory 1. Thus, when an idle time is caused, after the foregoing process of reading out the data D4 is finished, a process of reading out the encoded data D1 from the buffer area 5 is preferentially performed. That is, the third priority is assigned to the process of reading out the encoded data D1.

As with the data D1, the encoded data D6 has a small amount of data because the data D6 has been encoded using H.264 format. Also, there is a need of minimizing the number of switching between access for readout to the memory 1 and access for writing to the memory 1. Thus, when an idle time is caused, after the foregoing process of reading out the encoded data D1 is finished, a process of reading out the encoded data D6 from the buffer area 6 is preferentially performed. That is, the fourth priority is assigned to the process of reading out the encoded data D6.

The decoded data D2 which is output from the decoder 2 and written into the memory 1 has a large amount of data because the data D2 is formed by decoding the encoded data D1. Thus, when an idle time is caused, after the foregoing process of reading out the encoded data D6 is finished, a process of writing the decoded data D2 into the memory 1 is preferentially performed. That is, the fifth priority is assigned to the process of writing the decoded data D2.

The encoded data D1 has a small amount of data because the data D1 has been encoded using MPEG-2 format as described above. Thus, when an idle time is caused, after the foregoing process of writing the data D2 is finished, a process of writing the encoded data D1 into the buffer area 5 is preferentially performed. That is, the sixth priority is assigned to the process of writing the encoded data D1.

As with the data D1, the encoded data D6 has a small amount of data because the data D6 has been encoded using H.264 format. Thus, when an idle time is caused, after the foregoing process of writing the encoded data D1 is finished, a process of writing the encoded data D6 into the buffer area 6 is preferentially performed. That is, the seventh priority is assigned to the process of writing the encoded data D6.

It is noted, however, that the priorities respectively assigned to the above-described processes are just one example, and may be arbitrarily changed.

While the invention has been shown and described in detail, the foregoing description is in all aspects illustrative and not restrictive. It is therefore understood that numerous modifications and variations can be devised without departing from the scope of the invention.

The invention claimed is:

1. A memory access method for accessing a memory including a plurality of banks, the plurality of banks includes at least a first bank and a second bank, the method comprising:

dividing two-dimensional image data to be written into said memory into a plurality of data groups including at least a first data group and a second data group, each of the plurality of data groups having an amount of data less than or equal to a maximum amount transferable in a single burst transfer, and each of the first data group and second data group being further divided in half and arranged to be written into a plurality of rows in the plurality of banks included in the memory; and writing said plurality of data groups into said plurality of banks in successive order starting from the first bank and writing a remainder of the plurality of data groups into the plurality of banks in successive order starting from the first or second bank, when a number of the plurality of data groups exceeds a number of the plurality of banks, the first data group being written to odd-numbered rows and the second data group being written to even-numbered rows in the plurality of banks, and wherein an interval between a beginning of the successive writings into one of the plurality of banks is equal to or longer than a predetermined number of clock cycles and is equal to or shorter than a quotient of a product and two as a divisor, said product being a product of a burst length which is said amount of data and said number of the plurality of banks minus one.

2. The memory access method according to claim 1, wherein a first group of the plurality of data groups written into the plurality of banks are included in a first block which is a predicted destination of an observed block in said two-dimensional image data and a second group of the plurality of data groups written into the plurality of banks are included in a plurality of blocks not including the first block which are defined adjacent to said first block, the first and second groups of the plurality of data groups are read out from said memory successively to extract a motion vector of said observed block.

3. The memory access method according to claim 1, further comprising:

giving priority to an access to the second bank over a further access to the first bank when said first bank is being accessed and a request for the further access to said first bank and a request for access to said second bank are made concurrently.

4. The memory access method according to claim 1, wherein the plurality of data groups forming said two-dimensional image data are written into said plurality of banks such that a data set formed of n data groups, n being the number of the plurality of banks, which are respectively associated with different banks and arrayed in rows is repeatedly provided in each of rows of said two-dimensional image data stored in said memory.

5. A memory access method for accessing a memory including a plurality of banks, the plurality of banks includes at least a first bank and a second bank, the method comprising:

dividing two-dimensional image data stored in said memory into a plurality of data groups including at least a first data group and a second data group, each of the plurality of data groups having an amount of data less than or equal to a maximum amount transferable in a single burst transfer read out from said memory, and each of the first data group and the second data group being further divided in half and arranged to be read from a plurality of rows in the plurality of banks included in the memory; and reading out said plurality of data groups from said plurality of banks in successive order starting from the first bank and reading out a remainder of the plurality of data groups from the plurality of banks in successive order starting from the first or second bank, when a number of the plurality of data groups exceeds a number of the plurality of banks, the first data group being read from odd-numbered rows and the second data group being read from even-numbered rows in the plurality of banks, and wherein an interval between successive readouts from one of the plurality of banks is equal to or longer than a predetermined number of clock cycles, said interval being equal to or shorter than a quotient of a product and two as a divisor, said product being a product of a burst length which is said amount of data and a said number of the plurality of banks minus one.

6. The memory access method according to claim 5, wherein a first group of said plurality of data groups read from said plurality of banks are included in a first block which is a predicted destination of an observed block in said two-dimensional image data and a second group of said plurality of data groups read from said plurality of banks are included in a plurality of blocks not including said first block which are defined adjacent to said first block, the first and second groups of said plurality of data groups are read out from said memory successively to extract a motion vector of said observed block.

7. The memory access method according to claim 5, further comprising:

giving priority to an access to said second bank over a further access to said first bank when said first bank is being accessed and a request for the further access to said first bank and a request for access to said second bank are made concurrently.

8. The memory access method according to claim 5, wherein said plurality of data groups forming said two-dimensional image data are written into said plurality of banks such that a data set formed of n data groups, n being the number of said plurality of banks, which are respectively associated with different banks and arrayed in rows is repeatedly provided in each of rows of said two-dimensional image data stored in said memory.

9. The memory access method according to claim 1, wherein the plurality of banks includes a third bank and a fourth bank.

10. The memory access method according to claim 1, wherein each of a $k^{th}$ data group, where k is an odd number, is divided to be arranged into a plurality of rows of said two-dimensional image data stored in said memory, said $k^{th}$ data group is arranged in odd-numbered rows, and each of a $k+1^{th}$ data group is divided to be arranged into a plurality of rows of said two-dimensional image data stored in said memory, said $k+1^{th}$ data group is arranged in even-numbered rows.

11. The memory access method according to claim 1, wherein the amount of data included in each of the plurality of data groups is a plurality of bits.

12. The memory access method according to claim 1, wherein each of the plurality of data groups includes an equal amount of data.

13. A memory access method for accessing a memory including a plurality of banks, the plurality of banks including at least a first bank and a second bank, an interval between a beginning of a successive writings into one of said plurality of banks being longer than a predetermined number of clock cycles, the method comprising:

dividing two-dimensional image data to be written into said memory into a plurality of data groups, each of the plurality of data groups having an amount of data less than or equal to a maximum amount transferable in a single burst transfer; and writing a first data group included in said plurality of data groups into said first bank; and writing a second data group which is subsequent to said first data group into said second bank, wherein a first group of said plurality of data groups written into said plurality of banks are included in a first block which is a predicted destination of an observed block in said two-dimensional image data and a second group of said plurality of data groups written into said plurality of banks are included in a plurality of blocks not including said first block which are defined adjacent to said first block, said first and second groups of said plurality of groups are read out from said memory successively, to extract a motion vector of said observed block in said dividing two-dimensional image data.

14. A memory access method for accessing a memory including a plurality of banks, the plurality of banks includes at least a first bank and a second bank, an interval between a beginning of a successive readouts from one of said plurality of banks being longer than a predetermined number of clock cycles, the method comprising:

dividing two-dimensional image data stored in said memory into a plurality of data groups, each of the plurality of data groups having an amount of data less than or equal to a maximum amount transferable in a single burst transfer;

writing a first data group included in said plurality of data groups into said first bank; and writing a second data group which is subsequent to said first data group into said second bank, wherein a first group of said plurality of data groups read from said plurality of banks are included in a first block which is a predicted destination of an observed block in said two-dimensional image data and a second group of said plurality of data groups read from said plurality of banks are included in a plurality of blocks not including said first block which are defined adjacent to said first block, said first and second groups of said plurality of data groups are read out from said memory successively, to extract a motion vector of said observed block in said dividing two-dimensional image data.

* * * * *